United States Patent [19]
Takita et al.

[11] Patent Number: 5,922,492
[45] Date of Patent: Jul. 13, 1999

[54] MICROPOROUS POLYOLEFIN BATTERY SEPARATOR

[75] Inventors: Kotaro Takita; Koichi Kono; Norimitsu Kaimai; Soichiro Yamaguchi, all of Kawasaki, Japan

[73] Assignee: Tonen Chemical Corporation, Tokyo, Japan

[21] Appl. No.: 08/864,079

[22] Filed: May 28, 1997

[30] Foreign Application Priority Data

Jun. 4, 1996 [JP] Japan .................................. 8-163776
Aug. 2, 1996 [JP] Japan .................................. 8-220465

[51] Int. Cl.$^6$ .................................................. H01M 2/16
[52] U.S. Cl. ............................................ 429/249; 429/129
[58] Field of Search ................................ 429/129, 249; 428/903; 442/398, 340, 414

[56] References Cited

U.S. PATENT DOCUMENTS

| | | | |
|---|---|---|---|
| 4,873,034 | 10/1989 | Kono et al. ............................... | 264/41 |
| 4,921,587 | 5/1990 | Dong et al. .............................. | 204/84 |
| 4,969,981 | 11/1990 | Rogers et al. ........................... | 204/84 |
| 5,051,183 | 9/1991 | Takita et al. ....................... | 210/500.36 |
| 5,714,277 | 2/1998 | Kawakami ................................ | 429/62 |
| 5,786,058 | 7/1998 | Megchelsen et al. .................... | 428/57 |

FOREIGN PATENT DOCUMENTS

| | | |
|---|---|---|
| 60-23954 | 2/1985 | Japan . |
| 60-242035 | 12/1985 | Japan . |
| 61-195132 | 8/1986 | Japan . |
| 61-195133 | 8/1986 | Japan . |
| 63-39602 | 2/1988 | Japan . |

*Primary Examiner*—Maria Nuzzolillo
*Assistant Examiner*—Laura Weiner
*Attorney, Agent, or Firm*—Sughrue, Mion, Zinn, Macpeak & Seas, PLLC

[57] ABSTRACT

A microporous polyolefin composite membrane, preferably for use as a battery separator, comprising a microporous polyolefin membrane and a polyolefin nonwoven fabric laminated on at least one surface of the microporous polyolefin membrane. The composite membrane has a thickness of 25 to 200 $\mu$m, a porosity of 30 to 70%, an air permeability of 100 to 2000 sec/100 cc and a surface opening area ratio of 50 to 90% on at least one outer surface thereof. The microporous polyolefin membrane comprises a matrix polyolefin component which is a polyolefin having a weight average molecular weight of $5 \times 10^5$ or more or a polyolefin mixture containing the polyolefin having a weight average molecular weight of $5 \times 10^5$ or more, and has a porosity of 30 to 95%, an air permeability of 100 to 2000 sec/100 cc, an average open pore diameter of 0.001 to 1 $\mu$m and a tensile strength at break of 500 kg/cm$^2$ or more. The microporous polyolefin membrane may further comprise a shutdown polymer component to shut down the pores, thereby making the composite membrane impermeable. The polyolefin nonwoven fabric comprises fine fibers and has an air permeability of 0.1 to 100 sec/100 cc and a basis weight of 5 to 50 g/m$^2$. The polyolefin nonwoven fabric prevents the composite membrane from melting down at a low temperature thereby preventing the short-circuit between the electrodes.

5 Claims, No Drawings

MICROPOROUS POLYOLEFIN BATTERY SEPARATOR

BACKGROUND OF THE INVENTION

The present invention relates to a microporous polyolefin composite membrane for use as a separator of a nonaqueous battery such as a lithium battery, and more specifically, a microporous polyolefin composite membrane which has an excellent permeability and mechanical strength as well as a high safety to shut down at a low temperature the permeability when an unusually large amount of heat is generated due to short circuit of the battery.

Microporous polyolefin membranes are widely used in various applications such as various filters, battery separators, electrolytic capacitor separators, etc. Since a lithium battery utilizes lithium metal and lithium ion, an aprotic organic polar solvent is used as the solvent for electrolyte such as a lithium salt. Therefore, as the separator being disposed between a negative electrode and a positive electrode, a microporous membrane or a nonwoven fabric each made of a polyolefin such as polyethylene, polypropylene, etc. is used because they are insoluble in the aprotic organic polar solvent and chemically stable against the electrolyte and electrode active materials.

The lithium secondary battery is known as one of the secondary batteries of the highest energy density, because it has an electromotive force as high as 2.5 to 4 V and utilizes lithium having a low atomic weight as the main electrode active material. A button type or UM-3 type lithium secondary battery of a small capacity has been used as a backup battery for computer memory, a power source for handy phones, etc. However, since a capacity of about 10 kWh is required when a battery is applied to electric cars, etc., it has been demanded to develop a lithium battery having an enhanced capacity and an enhanced output power. Since the aprotic organic polar solvent has a low electroconductivity, the electric current density of the lithium battery is low. Therefore, a large surface area of the electrodes is necessary to obtain a large-size lithium battery enhanced in both the capacity and output power.

The separator for use in such a battery is desired to have suitably small pores in its matrix. However, since the contact surface between the electrodes and the separator reduces the effective surface area of the electrodes, the separator is preferable to have a rough surface on the microscopic scale and a relatively large pore size on its surface. Also, the separator should have a reasonable thickness which keeps both the electrodes spaced each other with an sufficient distance for safety's sake. Further, the holding capacity of the separator for the electrolyte solution should be enhanced to assure good battery characteristics such as discharge property and cycle property.

Recently, there has been proposed various methods for producing a high-strength and high-modulus microporous membrane from a ultrahigh molecular weight (UHMW) polyolefin. For example, in one of the methods, a UHMW polyolefin composition is heated to an elevated temperature in a solvent to form a solution of UHMW polyolefin. This solution is extruded to form a gel sheet which is then stretched under heating and extracted to remove the solvent from the stretched sheet to form a microporous structure in the sheet (Japanese Patent Laid-Open Nos. 60-242035, 61-195132, 61-195133 and, 63-39602, U.S. Pat. No. 4,873, 034, etc.). In another method of producing a microporous polyolefin membrane from a highly concentrated solution of UHMW polyolefin, the molecular weight distribution of a polyolefin composition containing UHMW is controlled within a specific range (U.S. Pat. No. 5,051,183). Although the microporous polyolefin membrane known in the art has a small pore size, it does not meet the requirement of the above secondary battery to have a high holding capacity and a high output level.

The lithium battery generates an intense heat due to short-circuit of the electrodes to cause ignition of lithium. Therefore, the battery separator should have a function to shut down the electric current flow through the separator membrane by clogging the pores, before lithium catches fire, with molten material which constitutes the membrane. However, since the known microporous polyolefin membranes are molten at a higher temperature, the pores are not effectively clogged at a temperature sufficiently low to prevent the ignition of lithium. Considering the above problems, it is desirable to lower the shutdown temperature to assure the safety of using the lithium battery. Thus, the lower the shutdown temperature is and the larger the temperature difference between the shutdown temperature and the breakdown temperature of the membrane is, the more excellent the battery is in its safety and reliability.

Japanese Patent Application No. 60-23954 discloses a technique to provide a battery separator with the shutdown function at short circuit. This document teaches that the use of a single-layered microporous film of polypropylene or polyethylene is desirable to prevent the ignition or explosion of the battery due to the meltdown of the separator material being caused when the temperature in the battery is elevated by Joule's heat generated in the external short circuit. When a battery is externally short-circuited, the temperature of the battery rises by Joule's heat to reach a melting point of the separator material, at which the single-layered microporous film of polypropylene or polyethylene begins to melt. The melt of separator material clogs the pores in the separator to prevent the ions from being transported through the separator, and makes the separator electrically insulating to shut off the current flow. Therefore, the temperature rise stops, and the ignition or explosion of the battery can be prevented.

However, at an elevated temperature around the melting point of a thermoplastic resin such as polyolefin, the cohesive force in the separator is so reduced that a separator comprising a single-layered microporous membrane is likely to be broken. Therefore, the problem of the ignition or explosion of battery still remains unsolved.

OBJECT AND SUMMARY OF THE INVENTION

Accordingly, an object of the present invention is to provide a microporous membrane having a low shutdown temperature and a high meltdown temperature (high breakdown temperature) as well as having good permeability and mechanical strength.

Another object of the present invention is to provide a microporous membrane having a large pore opening at the surface thereof so as to reduce the contact area between the microporous membrane and the surface of electrodes although having a small pore size inside the membrane.

A still another object of the present invention is to provide a microporous membrane having an enhanced holding capacity and a uniform surface appearance when wound on a winding tube so as to increase the capacity of a battery.

A still another object of the present invention is to provide a microporous membrane having a reasonable thickness for safety's sake.

As a result of the intense research in view of the above objects, the inventors have found that a composite membrane having the above properties can be obtained by laminating a specific microporous polyolefin membrane with at least one polyolefin nonwoven fabric having specific properties. The present invention has been accomplished by this finding.

Thus, in a first aspect of the present invention, there is provided a microporous polyolefin composite membrane comprising a microporous polyolefin membrane and a polyolefin nonwoven fabric laminated on at least one surface of the microporous polyolefin membrane, which composite membrane has a thickness of 25 to 200 μm, a porosity of 30 to 70%, an air permeability of 100 to 2000 sec/100 cc and a surface opening area ratio of 50 to 90% on at least one outer surface thereof, the microporous polyolefin membrane comprising a matrix polyolefin component which is a polyolefin having a weight average molecular weight of $5\times10^5$ or more or a polyolefin mixture containing the polyolefin having a weight average molecular weight of $5\times10^5$ or more, and having a porosity of 30 to 95%, an air permeability of 100 to 2000 sec/100 cc, an average open pore diameter of 0.001 to 1 μm and a tensile strength at break of 500 kg/cm$^2$ or more.

In a second aspect of the present invention, there is provided a battery separator comprising the microporous polyolefin composite membrane as specified above.

In a third aspect of the present invention, there is provided a method of producing the microporous polyolefin composite membrane as specified above, which comprises (1) preheating a starting polyolefin nonwoven fabric, (2) stacking the preheated polyolefin nonwoven fabric on at least one surface of a starting microporous polyolefin membrane without cooling the preheated polyolefin nonwoven fabric, and (3) calendering the stack.

DETAILED DESCRIPTION OF THE INVENTION

[1] Microporous polyolefin membrane

The starting material for producing the microporous polyolefin membrane of the present invention having an open-celled structure mainly comprises a matrix polyolefin component and an optional shutdown polymer component. The matrix polyolefin component is a polyolefin having a weight average molecular weight (Mw) of $5\times10^5$ or more or a polyolefin mixture containing thereof.

When Mw of the polyolefin is less than $5\times10^5$, an extruded gel sheet cannot be stretched at a sufficiently high stretch ratio, thereby failing to produce the microporous polyolefin membrane of the present invention. The upper limit of Mw is not critical, however, a polyolefin having Mw exceeding $15\times10^6$ may reduce the moldability in forming a gel sheet.

To prepare a highly concentrated polyolefin solution in the production process and to improve the mechanical strength of the resulting microporous polyolefin membrane, it is preferable to use as the matrix polyolefin component a polyolefin mixture containing a UHMW polyolefin having Mw of $1\times10^6$ or more, preferably $1\times10^6$ to $15\times10^6$ and a high molecular weight (HMW) polyolefin having Mw of not less than $1\times10^5$ and less than $1\times10^6$. The content of the UHMW polyolefin is 1 weight % or more, preferably 10 to 70 weight % based on the weight of the polyolefin mixture. The content of the HMW polyolefin is 99 weight % or less, preferably 30 to 90 weight % based on the weight of the polyolefin mixture. When the content of the UHMW polyolefin is less than 1 weight %, the entanglement of molecular chains contributing to the improvement of stretchability does not take place, failing to provide a high-strength microporous membrane.

The polyolefin for the matrix polyolefin component may be a crystalline homopolymer, a two-stage polymer, a copolymer or a blend thereof, each being obtained by polymerizing ethylene, propylene, 1-butene, 4-methyl-pentene-1, 1-hexene, etc. Among such polymers, polypropylene, polyethylene (particularly a high density polyethylene), and a mixture containing these polymers are preferable.

The ratio of weight average molecular weight/number average molecular weight (Mw/Mn) of the polyolefin and the polyolefin mixture, which is a measure showing uniformity of the molecular weight distribution, is preferably 300 or less, more preferably 5 to 50. When Mw/Mn exceeds 300, lower molecular weight components tend to be cut when stretched, resulting in the decrease in the overall strength of the resulting membrane.

An optional shutdown polymer component, i.e., a polymer which readily melts at a low temperature preferably 135° C. or lower to clog or shut down the pores, may be used in combination with the matrix polyolefin component. Such a shutdown polymer may be a low density polyethylene and a low molecular weight polyethylene. The low density polyethylene may include a high-pressure branched low density polyethylene (LDPE) preferably having a density of about 0.91 to 0.93 g/cm$^3$ and a melt index (MI measured at 190° C. under a load of 2.16 kgf) of 0.1 to 20 g/10 min, more preferably 0.5 to 10 g/10 min, and a low-pressure linear low density polyethylene (LLDPE) preferably having a density of 0.91 to 0.93 g/cm$^3$ and MI of 0.1 to 25 g/10 min, preferably 0.5 to 10 g/10 min. The low molecular weight polyethylene (LMWPE) is preferred to have Mw of 1000 to 4000 and a melting point of 80 to 130° C. The shutdown polymer such as LDPE, LLDPE and LMWPE may be used in an amount of 5 to 30 weight %, preferably 5 to 25 weight % based on the total weight of the shutdown polymer and the matrix polyolefin component. When the amount is less than 5 weight %, the shutdown effect at a low temperature is insufficient and the porosity is reduced, and an amount more than 30 weight % remarkably reduces the mechanical strength of the resulting microporous polyolefin membrane.

The method of producing the microporous polyolefin membrane according to the present invention will be explained below.

In general, a starting material comprising the matrix polyolefin component and the optional shutdown polymer component is subjected to the steps of: addition of an organic liquid or solid and an optional inorganic fine powder; melt-kneading; extrusion into the form of sheet, stretching and extraction. Preferably, the starting material is dissolved in a good solvent for the polyolefins in the starting material to prepare a solution, which is extruded from a die into the form of sheet. The sheet is gelated by cooling to form a gel sheet, which is then stretched at an elevated temperature and extracted to remove the solvent remaining the stretched sheet.

In more detail, the solution of the starting material is prepared by dissolving the starting material in a solvent under heating. The solvent is not specifically limited so long as it dissolves the starting material. Examples of the solvents include aliphatic or alicyclic hydrocarbons such as nonane, decane, undecane, dodecane, liquid paraffin, etc., and fractions of mineral oils having boiling points substantially equal to those of these hydrocarbons. Nonvolatile solvents such as liquid paraffin are preferable to obtain the gel sheet having uniform solvent contents. Dissolution of the starting material under heating may be carried out under vigorous stirring or kneading in an extruder at a temperature at which the starting material is completely dissolved in the solvent, preferably at 140 to 250° C. The concentration of the solution is preferably 10 to 80 weight %, more preferably 10 to 50 weight %. When the concentration is less than 10 weight %, a large amount of a solvent has to be used, and swelling and neck-in are likely to take place at the exit of a die in the process of forming sheets. Accordingly, it is difficult to produce large sheets. It is preferable to add an antioxidant to the solution to protect the polyolefin from degradation by oxidation.

Next, a heated solution of the starting material is extruded through a die into the form of sheet. Usually a sheet die having a rectangular orifice is used, and an inflation die having an annular orifice, etc. may be also used. When the sheet die is used, a die gap is usually 0.1 to 5 mm, and an extrusion temperature of the die is 140 to 250° C.

The solution extruded through the die is formed into a gel sheet by being cooled to a gelation temperature or lower. As a method of cooling, direct contact with cooling air, cooling water and other cooling media, contact with a roll cooled by a coolant, etc. may be employed. The solution extruded through a die may be drawn at a drawdown ratio of 1–10, preferably 1–5 before or after cooling.

The gel sheet is then subjected to a uniaxial or biaxial stretching treatment to impart a uniaxial or biaxial orientation to the gel sheet at a predetermined stretch ratio at an elevated temperature by an ordinary method such as a tenter method, a roll method, an inflation method, a calendering method, or a combination thereof. Biaxial stretching is preferable. It may be carried out by stretching the sheet in the machine direction (longitudinal direction) and a transverse direction (direction perpendicular to the machine direction) simultaneously or successively, and simultaneous biaxial stretching is more preferable.

The stretching temperature may be equal to or lower than a temperature which is 10° C. above the melting point of the starting material, preferably in the range from the crystal dispersion temperature to the crystal melting point. The stretch ratio varies depending on the original thickness of the gel sheet. The stretch ratio for the longitudinal or transverse uniaxial stretching operation is preferably two times or more, more preferably 3 to 30 times the original length. The stretch ratio for the biaxial stretching operation is preferably 10 times or more, more preferably 15 to 400 times the original area. When the stretch ratio in the biaxially stretching is less than 10 times the original area, the resulting microporous membrane does not acquire a high modulus and a high mechanical strength due to an insufficient orientation. On the other hand, a stretch ratio exceeding 400 times the original area requires a complicated and additional control of the stretching operation.

The thus stretched sheet is subjected to a solvent-removing treatment. Solvents used for the solvent-removing treatment may be highly volatile solvents including hydrocarbons such as pentane, hexane, heptane, etc.; chlorinated hydrocarbons such as methylene chloride and carbon tetrachloride; fluorinated hydrocarbons such as trifluoroethane; and ethers such as diethyl ether and dioxane. These volatile solvents may be used alone or in combination, and may be selected according to the nonvolatile solvents used to dissolve the starting material. The solvent remaining in the stretched sheet is removed by extracting the sheet with the above volatile solvent and/or spraying the volatile solvent on the sheet.

The solvent-removing treatment is repeated until the content of the residual solvent in the stretched sheet is reduced to less than 1 weight %. The stretched sheet is then dried to remove the volatile solvent by heating, air-cooling, etc. The dried stretched sheet is preferred to be heat-set at a temperature between the crystal dispersion temperature and the melting point.

The microporous polyolefin membrane produced as mentioned above has a porosity of 30 to 95%, an average open pore diameter of 0.001 to 1 $\mu$m, a tensile strength at break of 500 kg/cm$^2$ or more, an air permeability of 100 to 2000 sec/100 cc, and a surface opening area ratio of 30 to 70%. The thickness of the microporous polyolefin membrane is generally 5 to 50 $\mu$m before subjected to the subsequent laminating treatment.

The porosity of the microporous polyolefin membrane of the present invention may be defined as a percent ratio of the total volume occupied by the void space of a sample membrane to the bulk volume of the same sample which is the sum of the void space volume and the volume occupied by the solid material of the membrane, and calculated from the equation: % porosity=(1−density of sample membrane/density of starting material)×100.

The porosity of the microporous polyolefin membrane of the present invention is 30 to 95%, and preferably 30 to 50%. A porosity less than 30% is undesirable because the holding capacity of the membrane for the electrolyte solution is reduced, and a porosity more than 95% reduces the mechanical strength of the membrane to make the membrane scarcely fit for use.

The average open pore diameter referred to in the present invention is the average diameter of pores which are interconnected through more or less tortuous paths which extends from one exterior surface of the microporous polyolefin membrane to another. The average open pore diameter of the microporous polyolefin membrane of the present invention is 0.001 to 1 $\mu$m, preferably 0.001 to 0.5 $\mu$m, and more preferably 0.005 to 0.1 $\mu$m. When the average open pore diameter is smaller than 0.001 $\mu$m, the electrolyte solution cannot penetrate into the pores or cells, thereby making the ion transport through the open pores difficult. When the average open pore diameter exceeds 1 $\mu$m, the diffusion of the electrode active materials and the reaction products cannot be prevented.

To enhance the mechanical strength and prevent the tearing of the membrane, the tensile strength at break, measured according to ASTM D882, of the microporous polyolefin membrane is 500 kg/cm$^2$ or more.

The surface opening area ratio in the present invention means a area ratio of the total area occupied by the void opening of the pores on the surface of the microporous polyolefin membrane to the total surface area of the microporous polyolefin membrane which is the sum of the void surface area and the surface area occupied by the solid material. The surface opening area ratio is 30 to 70%.

[2] Polyolefin nonwoven fabric

Micro fibers for the polyolefin nonwoven fabric to be laminated on the microporous polyolefin membrane is preferred to have diameters from 0.1 to 5 $\mu$m. The basis weight of the polyolefin nonwoven fabric is 5 to 50 g m$^2$, and preferably 7 to 45 g/m$^2$. The air permeability is 0.1 to 100 sec/100 cc. The thickness before subjected to the lamination treatment is 30 to 500 $\mu$m.

The polyolefin nonwoven fabric may be produced from fibers of a crystalline homopolymer, a two-stage polymer, a copolymer or a blend thereof, each polymer being produced from ethylene, propylene, 1-butene, 4-methyl-pentene-1, 1-hexene, etc. Of the above polyolefin nonwoven fabrics, those produced by polypropylene fibers, polyethylene fibers, etc. are preferable. The polyolefin nonwoven fabric used in the present invention may be produced by a method known in the art.

[3] Microporous polyolefin composite membrane

The microporous polyolefin membrane described above is liable to change in its structure. However, when treated at an elevated temperature within a specific range during the lamination process, the surface of the microporous polyolefin membrane acquires a fine roughness which allows the microporous polyolefin membrane layer to strongly bond to the polyolefin nonwoven fabric layer without changing the properties of the microporous polyolefin membrane before subjected to the lamination process. Therefore, the microporous polyolefin composite membrane of the present invention is produced by the lamination treatment of a stack of the microporous polyolefin membrane and the polyolefin nonwoven fabric under a suitable heating.

A starting polyolefin nonwoven fabric having a thickness of 30 to 500 μm is preheated and regulated in its thickness at 50 to 120° C., preferably 50 to 100° C. for 2 to 60 seconds with or without applying a compression pressure of about 5 to 30 kgf/cm² by passing the starting polyolefin nonwoven fabric through a pair of heating pressure rolls, etc. When the preheating temperature is lower than 50° C., the preheating is insufficient, and the surface opening area ratio is reduced when the preheating temperature is higher than 120° C.

Separately, a starting microporous polyolefin membrane may be optionally preheated, if desired, at 50 to 100° C. for 2 to 60 seconds.

The polyolefin nonwoven fabric thus preheated and the microporous polyolefin membrane optionally preheated are stacked each other immediately after each preheating, and calendered at 50 to 140° C., preferably 90 to 120° C. while applying a compression pressure of 5 to 30 kgf/cm², preferably 5 to 20 kgf/cm² by passing the stack through a plurality of pairs of the calender rolls to obtain a microporous polyolefin composite membrane of the present invention. If the calender roll pressure is less than 5 kgf/cm², the bonding strength between the microporous polyolefin membrane and the polyolefin nonwoven fabric is insufficient, and the surface opening area ratio of the polyolefin nonwoven fabric is reduced when exceeding 30 kgf/cm². When the calendering temperature exceeds 140° C., the permeability of the microporous polyolefin membrane is reduced, whereas the bonding of the microporous polyolefin membrane and the polyolefin nonwoven fabric is insufficient when the calendering temperature is lower than 50° C.

The polyolefin nonwoven fabric may be laminated on one of the surface of the microporous polyolefin membrane or may be laminated on both the surfaces of the microporous polyolefin membrane. Thus, the preferred layered structure of the microporous polyolefin composite membrane of the present invention is a two-layered structure of microporous polyolefin membrane/polyolefin nonwoven fabric and a three-layered structure of polyolefin nonwoven fabric/microporous polyolefin membrane/polyolefin nonwoven fabric.

The total thickness of the microporous polyolefin composite membrane thus produce is preferably 25 to 200 μm, and preferably 25 to 100 μm.

The microporous polyolefin composite membrane of the present invention has a surface opening area ratio of 50 to 90% on at least one outer surface thereof. When the surface opening area ratio is less than 50%, a sufficient effective surface area of the electrodes cannot be ensured, and the capacity and electric characteristics of battery cannot be improved because the holding capacity of the separator for the electrolyte solution is not increased. In addition, the by-product is not effectively captured by the separator. On the other hand, when the surface opening area ratio is larger than 90%, the mechanical strength of the microporous polyolefin composite membrane (separator) is poor.

The porosity of the microporous polyolefin composite membrane is 30 to 70%, preferably 30 to 50%, and the air permeability is 100 to 2000 sec/100 cc, preferably 200 to 1500 sec/100 cc.

The microporous polyolefin composite membrane of the present invention further has a shutdown temperature at which the air permeability of the composite membrane is raised to 100,000 sec/100 cc or more is 135° C. or lower, preferably 105 to 135° C., and a meltdown temperature at which the separator (microporous polyolefin composite membrane) is broken or ruptured due to the meltdown of the matrix polyolefin is 165° C. or higher.

Also, the holding capacity for the electrolyte solution of the microporous polyolefin composite membrane, which is represented by a weight percent ratio of the amount of γ-butyrolactone held in the microporous polyolefin composite membrane to the weight of the microporous polyolefin composite membrane, is 30 to 80%, preferably 35 to 80%.

The present invention will be further described while referring to the following Examples which should be considered to illustrate various preferred embodiments of the present invention.

In the following examples and comparative examples, each property was measured as follows.

(1) Thickness

Measured by observing the cross section under a scanning electron microscope.

(2) Air permeability

Measured according to JIS P8117.

(3) Porosity

Determined by measuring the density of the starting material and the density of the membrane, and calculating the equation: (1−density of sample membrane/density of starting material)×100.

(4) Average open pore diameter

Determined by using Omnisorp 360 manufactured by Nikkiso K.K.

(5) Surface opening area ratio and opening pore size

Determined from electron microphotograph.

(6) Tensile strength at break

Measured according to ASTM D882 using rectangular sample having a width of 10 mm.

(7) Shutdown temperature

A temperature at which the air permeability reached to 100,000 sec/100 cc or more was measured by heating the sample composite membrane.

(8) Meltdown temperature

A temperature at which the sample composite membrane was broken due to meltdown of the matrix polyolefin was measured by heating the sample composite membrane.

(9) Holding capacity

The weight of γ-butyrolactone held in the sample composite membrane was measured, and the holding capacity was represented by the ratio of the weight of γ-butyrolactone to the weight of the sample composite membrane.

(10) Sagging amount

The surface appearance of as-wound membrane was evaluated by a sagging amount. A rectangular sample (1.5 m length and 0.4 m width) of the composite membrane was horizontally supported on a pair of rolls spaced 1 m apart (between the centers) while one of the ends of the sample was fixed. A load of 0.4 kgf was put on the other end equally and gravitationally, and the sagging amount of the central portion of the sample composite membrane was measured. The maximum value after several repeated measurements was employed. When a membrane having a large sagging amount is wound on a winding tube, the surface of as-wound membrane presents a wavy appearance.

EXAMPLE 1

A polyolefin mixture consisting of 6 parts by weight of a UHMW polyethylene having Mw of $2.5 \times 10^6$ and 24 parts by weight of an HMW polyethylene (high density polyethylene) having Mw of $3.5 \times 10^5$ was prepared. To 100 parts by weight of the polyolefin mixture thus prepared, were added 0.375 parts by weight of an antioxidant. The 30 parts by weight of the resultant mixture was fed into a twin screw intensive extruder (outer diameter=58 mm, and L/D= 42). The mixture was melt-kneaded in the extruder while feeding 70 parts by weight of a liquid paraffin from a side feeder to prepare a polyolefin solution.

The polyolefin solution was extruded from a T-die of the extruder into the form of sheet which was taken-up by a pair of cooling rolls to form a gel sheet. The gel sheet was subjected to a simultaneous biaxial stretching by a stretch ratio of 5 times the original length in both the machine direction and the transverse direction at 115° C. to obtain a stretched membrane, which was then washed by methylene chloride to remove the liquid paraffin remaining in the membrane, dried and heat-set at 120° C. to produce a microporous polyethylene membrane of a thickness of 25 $\mu$m.

The microporous polyethylene membrane thus produced was laminated with a melt-blown polypropylene nonwoven fabric (fiber diameter: 4 $\mu$m; basis weight: 7 g/m$^2$; thickness: 60 $\mu$m) by calendering under the conditions shown in Table 1 to obtain a microporous polyethylene composite membrane.

EXAMPLE 2

Except for using a polyolefin mixture consisting of 6 parts by weight of the same UHMW polyethylene, 24 parts by weight of the same HMW polyethylene and 5 parts by weight of LDPE (density: 0.91 g/cm$^3$; MI: 2.0 g/10 min), and regulating the thickness of the microporous polyethylene membrane to 15 $\mu$m, the same procedures as in Example 1 were repeated to obtain a microporous polyethylene composite membrane.

EXAMPLE 3

Except for using a polyolefin mixture consisting of 6 parts by weight of the same UHMW polyethylene, 24 parts by weight of the same HMW polyethylene and 5 parts by weight of LMWPE (melting point: 126° C.; Mw: 4000), and regulating the thickness of the microporous polyethylene membrane to 15 $\mu$m, the same procedures as in Example 1 were repeated to obtain a microporous polyethylene composite membrane.

EXAMPLE 4

Except for using a polyolefin mixture consisting of 6 parts by weight of the same UHMW polyethylene, 24 parts by weight of the same HMW polyethylene and 5 parts by weight of LMWPE (melting point: 116° C.; Mw: 1000), and regulating the thickness of the microporous polyethylene membrane to 15 $\mu$m, the same procedures as in Example 1 were repeated to obtain a microporous polyethylene composite membrane.

EXAMPLE 5

Except for laminating the polypropylene nonwoven fabrics on both the surface of the microporous polyethylene membrane, the same procedures as in Example 1 were repeated to obtain a microporous polyethylene composite membrane of three-layered structure.

EXAMPLE 6

Except for using a polypropylene nonwoven fabric (fiber diameter: 4 $\mu$m; basis weight: 40 g/m$^2$; thickness: 440 $\mu$m), the same procedures as in Example 1 were repeated to obtain a microporous polyethylene composite membrane.

EXAMPLE 7

Except for using a polypropylene nonwoven fabric (fiber diameter: 4 $\mu$m; basis weight: 22 g/m$^2$; thickness: 230 $\mu$m) and changing the calendering temperature to 120° C., the same procedures as in Example 1 were repeated to obtain a microporous polyethylene composite membrane.

COMPARATIVE EXAMPLE 1

The microporous polyethylene membrane of Example 1 having no laminated polyolefin nonwoven fabric was used.

The properties of the above microporous polyethylene composite membranes (Examples 1 to 7) and the microporous polyolefin membrane (Comparative Example 1), measured as described above, are shown in Table 1.

TABLE 1

|  | Examples | | | |
|---|---|---|---|---|
|  | 1 | 2 | 3 | 4 |
| MICROPOROUS POLYOLEFIN MEMBRANE Composition (parts by weight) | | | | |
| UHMWPE | 6 | 6 | 6 | 6 |
| HDPE | 24 | 24 | 24 | 24 |
| LDPE | — | 5 | — | — |
| LMWPE | — | — | 5 | 5 |
| Thickness ($\mu$m) | 25 | 15 | 15 | 15 |
| Air permeability (sec/100 cc) | 590 | 250 | 250 | 250 |
| Porosity (%) | 40 | 37 | 38 | 35 |

TABLE 1-continued

| | | | | |
|---|---|---|---|---|
| Average open pore diameter (μm) | 0.030 | 0.025 | 0.025 | 0.025 |
| Surface opening area ratio (%) | 40 | 40 | 40 | 40 |
| Tensile strength at break (kg/cm$^2$) | | | | |
| MD | 1225 | 1160 | 1063 | 965 |
| TD | 944 | 830 | 912 | 740 |
| POLYOLEFIN NONWOVEN FABRIC | | | | |
| Polyolefin | PP | PP | PP | PP |
| Thickness (μm) | 60 | 60 | 60 | 60 |
| Basis weight (g/m$^2$) | 7 | 7 | 7 | 7 |
| Air permeability (sec/100 cc) | <1 | <1 | <1 | <1 |
| PRODUCTION CONDITIONS | | | | |
| Preheating temperature of polyolefin nonwoven fabric (° C.) | 80 | 80 | 80 | 80 |
| Calendering temperature (° C.) | 115 | 115 | 115 | 115 |
| Calendering pressure (kgf/cm$^2$) | 10 | 10 | 10 | 10 |
| Calendering speed (m/min) | 7 | 7 | 7 | 7 |
| COMPOSITE MEMBRANE | | | | |
| Number of layers | 2 | 2 | 2 | 2 |
| Thickness (μm) | 40 | 30 | 32 | 31 |
| Porosity (%) | 45 | 50 | 50 | 50 |
| Air permeability (sec/100 cc) | 592 | 712 | 632 | 720 |
| Shutdown temperature (° C.) | 135 | 125 | 115 | 105 |
| Meltdown temperature (° C.) | 185 | 185 | 185 | 185 |
| Surface opening area ratio (%) | | | | |
| observe | 75 | 75 | 75 | 75 |
| reverse | 40 | 37 | 38 | 35 |
| Surface pore size (μm) | | | | |
| observe | 20 | 20 | 20 | 20 |
| reverse | 0.03 | 0.03 | 0.03 | 0.03 |
| Holding capacity (wt. %) | 61 | 67 | 68 | 66 |
| Sagging amount (mm) | 3 | 4 | 5 | 5 |

| | Examples | | | Com. Ex. |
|---|---|---|---|---|
| | 5 | 6 | 7 | 1 |
| MICROPOROUS POLYOLEFIN MEMBRANE Composition (parts by weight) | | | | |
| UHMWPE | 6 | 6 | 6 | 6 |
| HDPE | 24 | 24 | 24 | 24 |
| LDPE | — | — | — | — |
| LMWPE | — | — | — | — |
| Thickness (μm) | 25 | 25 | 25 | 25 |
| Air permeability (sec/100 cc) | 590 | 590 | 590 | 590 |
| Porosity (%) | 40 | 40 | 40 | 40 |
| Average pore diameter (μm) | 0.030 | 0.030 | 0.030 | 0.030 |
| Surface opening area ratio (%) | 40 | 40 | 40 | 40 |
| Tensile strength at break (kg/cm$^2$) | | | | |
| MD | 1225 | 1225 | 1225 | 1225 |
| TD | 944 | 944 | 944 | 944 |
| POLYOLEFIN NONWOVEN FABRIC | | | | |
| Polyolefin | PP | PP | PP | — |
| Thickness (μm) | 60 | 440 | 230 | — |
| Basis weight (g/m$^2$) | 7 | 40 | 22 | — |
| Air permeability (sec/100 cc) | <1 | <1 | <1 | — |
| PRODUCTION CONDITIONS | | | | |
| Preheating temperature of polyolefin nonwoven fabric (° C.) | 80 | 80 | 80 | — |
| Calendering temperature (° C.) | 115 | 115 | 120 | — |
| Calendering pressure (kgf/cm$^2$) | 10 | 10 | 10 | — |
| Calendering speed (m/min) | 7 | 7 | 7 | — |
| COMPOSITE MEMBRANE | | | | |
| Number of layers | 3 | 2 | 2 | 1 |
| Thickness (μm) | 64 | 135 | 100 | 25 |
| Porosity (%) | 43 | 70 | 60 | 40 |
| Air permeability (sec/100 cc) | 722 | 960 | 958 | 612 |
| Shutdown temperature (° C.) | 135 | 135 | 135 | 135 |
| Meltdown temperature (° C.) | 185 | 185 | 185 | 165 |

TABLE 1-continued

| Surface opening area ratio (%) | | | | |
|---|---|---|---|---|
| observe | 76 | 68 | 70 | 40 |
| reverse | 77 | 40 | 40 | 40 |
| Surface pore size (μm) | | | | |
| observe | 20 | 17 | 18 | 0.03 |
| reverse | 20 | 0.03 | 0.03 | 0.03 |
| Holding capacity (wt. %) | 58 | 72 | 70 | 39 |
| Sagging amount (mm) | 3 | 3 | 3 | 15 |

EXAMPLE 8

A microporous polyethylene membrane produced in the same manner as in Example 1 was laminated with a polypropylene nonwoven fabric (fiber diameter: 4 μm; basis weight: 7 g/m²; thickness: 50 μm; air permeability: less than 1 sec/100 cc) by calendering under the conditions shown in Table 2 to obtain a microporous polyethylene composite membrane.

EXAMPLE 9

Except for changing the calendering temperature and the calendering pressure to 100° C. and 10 kgf/cm², the same procedures as in Example 8 were repeated to obtain a microporous polyethylene composite membrane.

EXAMPLE 10

Except for laminating a microporous polyethylene membrane having a thickness of 15 μm and an air permeability of 200 sec/100 cc with a polypropylene nonwoven fabric (fiber diameter: 4 μm; basis weight: 6 g/m²; thickness: 30 μm; air permeability: less than 1 sec/100 cc), the same procedures as in Example 8 were repeated to obtain a microporous polyethylene composite membrane.

EXAMPLE 11

Except for laminating two sheets of polypropylene nonwoven fabrics (fiber diameter: 4 μm; basis weight: 6 g/m²; thickness: 30 μm; air permeability: less than 1 sec/100 cc) on both the surface of a microporous polyethylene membrane having a thickness of 15 μm and an air permeability of 200 sec/100 cc and changing the calendering temperature to 115° C., the same procedures as in Example 8 were repeated to obtain a microporous polyethylene composite membrane of three-layered structure.

EXAMPLE 12

Except for laminating a microporous polyethylene membrane having an air permeability of 560 sec/100 cc with a polyethylene nonwoven fabric (Tyvek® manufactured by E. I. Du Pont de Nemours and Company; thickness: 100 μm; basis weight: 41 g/m²; air permeability: 100 sec/100 cc) and changing the calendering pressure and the calendering speed to 5 kg/cm² and 3 m/min, the same procedures as in Example 8 to obtain a microporous polyethylene composite membrane.

EXAMPLE 13

Except for changing the calendering temperature to 105° C., the same procedures as in Example 12 to obtain a microporous polyethylene composite membrane.

COMPARATIVE EXAMPLE 2

The microporous polyethylene membrane of Example 8 having no laminated polyolefin nonwoven fabric was used.

COMPARATIVE EXAMPLE 3

Except for changing the calendering temperature to 145° C., the same procedures as in Example 8 to obtain a microporous polyethylene composite membrane.

COMPARATIVE EXAMPLE 4

Except for using a microporous polyethylene membrane having an air permeability of 2119 sec/100 cc, porosity of 27% and average pore size of 0.020 μm, the same procedures as in Example 8 to obtain a microporous polyethylene composite membrane.

COMPARATIVE EXAMPLE 5

Except for using a polypropylene nonwoven fabric (fiber diameter: 4 μm; basis weight: 55 g/m²; thickness: 100 μm) and changing the calendering temperature to 120° C., the same procedures as in Example 8 were repeated. However, both the polypropylene nonwoven fabric and the microporous polyethylene membrane were not boded to each other to fail in obtaining a microporous polyethylene composite membrane.

The properties of the above microporous polyethylene composite membranes (Examples 8 to 13 and Comparative Examples 3 and 4) and the microporous polyolefin membrane (Comparative Example 2), measured as described above, are shown in Table 2.

TABLE 2

| | Examples | | | | |
|---|---|---|---|---|---|
| | 8 | 9 | 10 | 11 | 12 |
| MICROPOROUS POLYOLEFIN MEMBRANE Composition (parts by weight) | | | | | |
| UHMWPE | 6 | 6 | 6 | 6 | 6 |
| HDPE | 24 | 24 | 24 | 24 | 24 |

TABLE 2-continued

|  |  |  |  |  |  |
|---|---|---|---|---|---|
| LDPE | — | — | — | — | — |
| LMWPE | — | — | — | — | — |
| Thickness ($\mu$m) | 25 | 25 | 15 | 15 | 25 |
| Air permeability (sec/100 cc) | 590 | 590 | 200 | 200 | 560 |
| Porosity (%) | 40 | 40 | 40 | 40 | 40 |
| Average pore diameter ($\mu$m) | 0.030 | 0.030 | 0.030 | 0.030 | 0.030 |
| Surface opening area ratio (%) | 40 | 40 | 40 | 40 | 40 |
| Tensile strength at break (kg/cm$^2$) | | | | | |
| MD | 1225 | 1225 | 1200 | 1200 | 1225 |
| TD | 945 | 945 | 920 | 920 | 945 |
| POLYOLEFIN NONWOVEN FABRIC | | | | | |
| Polyolefin | PP | PP | PP | PP | PE |
| Thickness ($\mu$m) | 50 | 50 | 30 | 30 | 100 |
| Basis weight (g/m$^2$) | 7 | 7 | 6 | 6 | 41 |
| Air permeability (sec/100 cc) | <1 | <1 | <1 | <1 | 100 |
| PRODUCTION CONDITIONS | | | | | |
| Preheating temperature of polyolefin nonwoven fabric (° C.) | 80 | 80 | 80 | 80 | 80 |
| Calendering temperature (° C.) | 110 | 100 | 110 | 115 | 110 |
| Calendering pressure (kgf/cm$^2$) | 16 | 10 | 16 | 16 | 5 |
| Calendering speed (m/min) | 20 | 20 | 20 | 20 | 3 |
| COMPOSITION MEMBRANE | | | | | |
| Number of layers | 2 | 2 | 2 | 3 | 2 |
| Thickness ($\mu$m) | 45 | 50 | 32 | 72 | 122 |
| Porosity (%) | 45 | 45 | 46 | 42 | 40 |
| Air permeability (sec/100 cc) | 630 | 612 | 252 | 956 | 1010 |
| Shutdown temperature (° C.) | 135 | 135 | 135 | 135 | 120 |
| Meltdown temperature (° C.) | 185 | 185 | 185 | 185 | 165 |
| Surface opening area ratio (%) | | | | | |
| observe | 76 | 79 | 72 | 76 | 59 |
| reverse | 40 | 40 | 40 | 77 | 40 |
| Surface pore size ($\mu$m) | | | | | |
| observe | 20 | 20 | 18 | 20 | 30 |
| reverse | 0.03 | 0.03 | 0.03 | 20 | 0.03 |
| Holding capacity (wt. %) | 57.6 | 59.4 | 61.3 | 58.0 | 55.5 |
| Sagging amount (mm) | 4 | 3 | 3 | 2 | 5 |

|  | Example | Comparative Examples | | | |
|---|---|---|---|---|---|
|  | 13 | 2 | 3 | 4 | 5 |
| MICROPOROUS POLYOLEFIN MEMBRANE Composition (parts by weight) | | | | | |
| UHMWPE | 6 | 6 | 6 | 6 | 6 |
| HDPE | 24 | 24 | 24 | 24 | 24 |
| LDPE | — | — | — | — | — |
| LMWPE | — | — | — | — | — |
| Thickness ($\mu$m) | 25 | 25 | 25 | 25 | 25 |
| Air permeability (sec/100 cc) | 560 | 590 | 590 | 2119 | 590 |
| Porosity (%) | 40 | 40 | 40 | 27 | 40 |
| Average pore diameter ($\mu$m) | 0.030 | 0.030 | 0.030 | 0.020 | 0.030 |
| Surface opening area ratio (%) | 40 | 40 | 40 | 25 | 40 |
| Tensile strength at break (kg/cm$^2$) | | | | | |
| MD | 1225 | 1225 | 1225 | 1415 | 1225 |
| TD | 945 | 945 | 945 | 1100 | 945 |
| POLYOLEFIN NONWOVEN FABRIC | | | | | |
| Polyolefin | PE | — | PP | PP | PP |
| Thickness ($\mu$m) | 100 | — | 50 | 50 | 100 |
| Basis weight (g/m$^2$) | 41 | — | 7 | 7 | 55 |
| Air permeability (sec/100 cc) | 100 | — | <1 | <1 | <1 |
| PRODUCTION CONDITIONS | | | | | |
| Preheating temperature of polyolefin nonwoven fabric (° C.) | 80 | — | 80 | 80 | 80 |
| Calendering temperature (° C.) | 105 | — | 145 | 110 | 120 |
| Calendering pressure (kgf/cm$^2$) | 5 | — | 16 | 16 | 16 |
| Calendering speed (m/min) | 3 | — | 20 | 20 | 20 |

TABLE 2-continued

| COMPOSITE MEMBRANE | | | | | |
|---|---|---|---|---|---|
| Number of layers | 2 | 1 | 2 | 2 | — |
| Thickness (μm) | 125 | 25 | 45 | 45 | — |
| Porosity (%) | 40 | 37 | 45 | 40 | — |
| Air permeability (sec/100 cc) | 962 | 590 | 3219 | 2427 | — |
| Shutdown temperature (° C.) | 120 | 135 | 135 | 135 | — |
| Meltdown temperature (° C.) | 165 | 165 | 185 | 185 | — |
| Surface opening area ratio (%) | | | | | |
| observe | 60 | 40 | 76 | 76 | — |
| reverse | 40 | 40 | 32 | 23 | — |
| Surface pore size (μm) | | | | | |
| observe | 30 | 0.03 | 20 | 20 | — |
| reverse | 0.03 | 0.03 | 0.03 | 0.02 | — |
| Holding capacity (wt. %) | 56.3 | 38.5 | 61 | 50 | — |
| Sagging amount (mm) | 5 | 15 | 4 | 5 | — |

As seen from the results, the microporous polyolefin composite membranes of the present invention are well-balanced in the properties required for a battery separator, namely, has a low shutdown temperature, a high meltdown temperature, a high air permeability, a large opening area of the surface pores, a small size of the inside pores, a large holding capacity for the electrolyte solution, etc. In addition, since the microporous polyolefin membrane and the polyolefin nonwoven fabric are laminated at a relatively low temperature without using any adhesive, the electrolytes in the solution are effectively transported through the microporous polyolefin composite membrane without being hindered at the interface between the microporous polyolefin membrane and the polyolefin nonwoven fabric. Therefore, the microporous polyolefin composite membranes of the present invention are useful as the battery separator.

What is claimed is:

1. A battery separator comprising a microporous polyolefin composite membrane comprising a microporous polyolefin membrane and a polyolefin nonwoven fabric laminated on at least one surface of said microporous polyolefin membrane, which battery separator has a thickness of 25 to 200 μm, a porosity of 30 to 70%, an air permeability of 100 to 2000 sec/100 cc, a surface opening area ratio of 50 to 90% on at least one outer surface thereof, and a holding capacity of 30 to 80% when represented by a weight percentage of an amount of γ-butyrolactone held therein to the weight of said microporous polyolefin membrane, said microporous polyolefin membrane comprising a matrix polyolefin component which is a polyolefin having a weight average molecular weight of $5 \times 10^5$ or more or a polyolefin mixture containing said polyolefin having a weight average molecular weight of $5 \times 10^5$ or more and having a porosity of 30 to 95%, an air permeability of 100 to 2000 sec/100 cc, an average open pore diameter of 0.001 to 1 μm and a tensile strength at break of 500 kgf/cm$^2$ or more, and said polyolefin nonwoven fabric comprising fine fibers having a diameter of 0.1 to 50 μm and having an air permeability of 0.1 to 100 sec/100 cc and a basis weight of 5 to 50 g/m$^2$.

2. The battery separator according to claim 1, wherein said polyolefin mixture comprises a ultrahigh molecular weight polyolefin having a weight average molecular weight of $1 \times 10^6$ to $15 \times 10^6$ and a high molecular weight polyolefin having a weight average molecular weight of $1 \times 10^5$ or more and less than $1 \times 10^6$.

3. The battery separator according to claim 1, wherein said microporous polyolefin membrane comprises 70 to 95 weight % of said matrix polyolefin component and 5 to 30 weight % of a shutdown polymer component selected from the group consisting of a low molecular weight polyethylene having a weight average molecular weight of 1000 to 4000 and a melting point of 80 to 130° C., a low density polyethylene having a density of 0.91 to 0.93 g/cm$^3$ and a melt flow index of 0.1 to 20 g/10 min when measured at 190° C. under a load of 2.16 kgf, and a linear low density polyethylene having a density of 0.91 to 0.93 g/cm$^3$ and a melt flow index of 0.1 to 25 g/10 min when measured at 190° C. under a load of 2.16 kgf, each weight percentage being based on the total weight of said matrix polyolefin component and said shutdown polymer component.

4. The battery separator according to claim 1, having a shutdown temperature of 135° C. or lower.

5. The battery separator according to claim 1, having a meltdown temperature of 165° C. or higher.

* * * * *